US012145232B2

(12) United States Patent
Ketelaer et al.

(10) Patent No.: US 12,145,232 B2
(45) Date of Patent: Nov. 19, 2024

(54) ANTERIOR SPINDLE DEVICE FOR USE ON A MACHINE TOOL

(71) Applicant: DMG MORI Ultrasonic Lasertec GmbH, Stipshausen (DE)

(72) Inventors: Jens Ketelaer, Wiesbaden (DE); Gaston Schwenk, Simmern (DE); Fabian Franzmann, Veitsrodt (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 441 days.

(21) Appl. No.: 17/622,655

(22) PCT Filed: Jul. 17, 2020

(86) PCT No.: PCT/EP2020/070305
§ 371 (c)(1),
(2) Date: Dec. 23, 2021

(87) PCT Pub. No.: WO2021/018635
PCT Pub. Date: Feb. 4, 2021

(65) Prior Publication Data
US 2022/0355429 A1    Nov. 10, 2022

(30) Foreign Application Priority Data

Jul. 30, 2019   (DE) .................... 10 2019 211 287.0

(51) Int. Cl.
*B23Q 3/12*     (2006.01)
*B23B 37/00*    (2006.01)
*B23Q 11/00*    (2006.01)

(52) U.S. Cl.
CPC .............. *B23Q 3/12* (2013.01); *B23B 37/00* (2013.01); *B23Q 11/001* (2013.01)

(58) Field of Classification Search
CPC .... B23Q 11/001; B23Q 11/0028; B23Q 5/32; B23Q 5/22; B23Q 3/12; B23B 37/00
See application file for complete search history.

(56) References Cited

U.S. PATENT DOCUMENTS 6,367,359 B1 * 4/2002 Ropos ............... B23B 29/03467
                                                        82/1.4
8,096,736 B2    1/2012 Migliore et al.
(Continued)

FOREIGN PATENT DOCUMENTS

CN       1295901 A    5/2001
CN     108500310 A    9/2018
(Continued)

OTHER PUBLICATIONS

Office Action dated Mar. 29, 2024 for Chinese App. Ser. No. 202080052739.0 with English Translation.
(Continued)

*Primary Examiner* — Alan Snyder
(74) *Attorney, Agent, or Firm* — Henricks Slavin LLP

(57) ABSTRACT

The present invention relates to an anterior spindle device for use on a machine tool, comprising a clamping interface 12 for clamping the anterior spindle device on a work spindle of the machine tool, an anterior spindle unit 14 with a spindle 14*a* for driving a drilling tool clamped on the spindle 14*a*, a drive 15 for exerting a force on the anterior spindle unit 14, and an electromagnetic actuator 16 for exerting a counterbalancing force opposite to the force of the drive 15 on the anterior spindle unit 14.

31 Claims, 8 Drawing Sheets

(56) References Cited

U.S. PATENT DOCUMENTS

| | | |
|---|---|---|
| 10,207,379 B2 | 2/2019 | Angel et al. |
| 2006/0032887 A1 | 2/2006 | Haynie et al. |
| 2017/0072476 A1 | 3/2017 | Baird |

FOREIGN PATENT DOCUMENTS

| | | |
|---|---|---|
| DE | 10 2009 012 805 A1 | 10/2009 |
| DE | 102017102094 A1 | 8/2018 |
| EP | 3357636 A1 | 8/2018 |
| JP | 2005-088183 A | 4/2005 |
| JP | 2009-142140 A | 6/2009 |
| JP | 2009-166204 A | 7/2009 |
| JP | 2009-241225 A | 10/2009 |
| JP | 2014-111972 A | 6/2014 |

OTHER PUBLICATIONS

International Search Report dated Nov. 2, 2020 for PCT App. Ser. No. PCT/EP2020/070305.
Examination Report dated Jul. 1, 2020 for German App. Ser. No. 10 2019 211 287.0 with English Translation.
Office Action dated Jul. 30, 2024 for Japanese App. Ser. No. 2022-506096 with English Translation.

\* cited by examiner

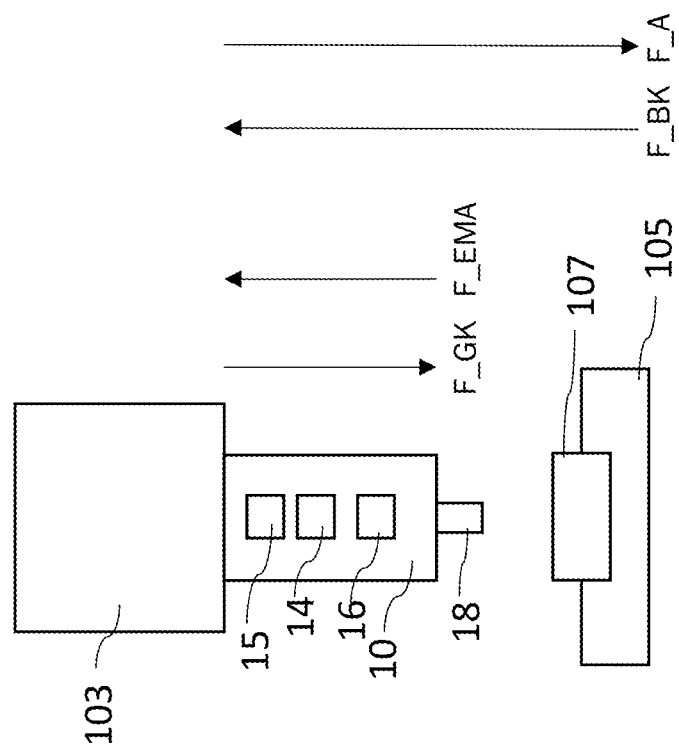

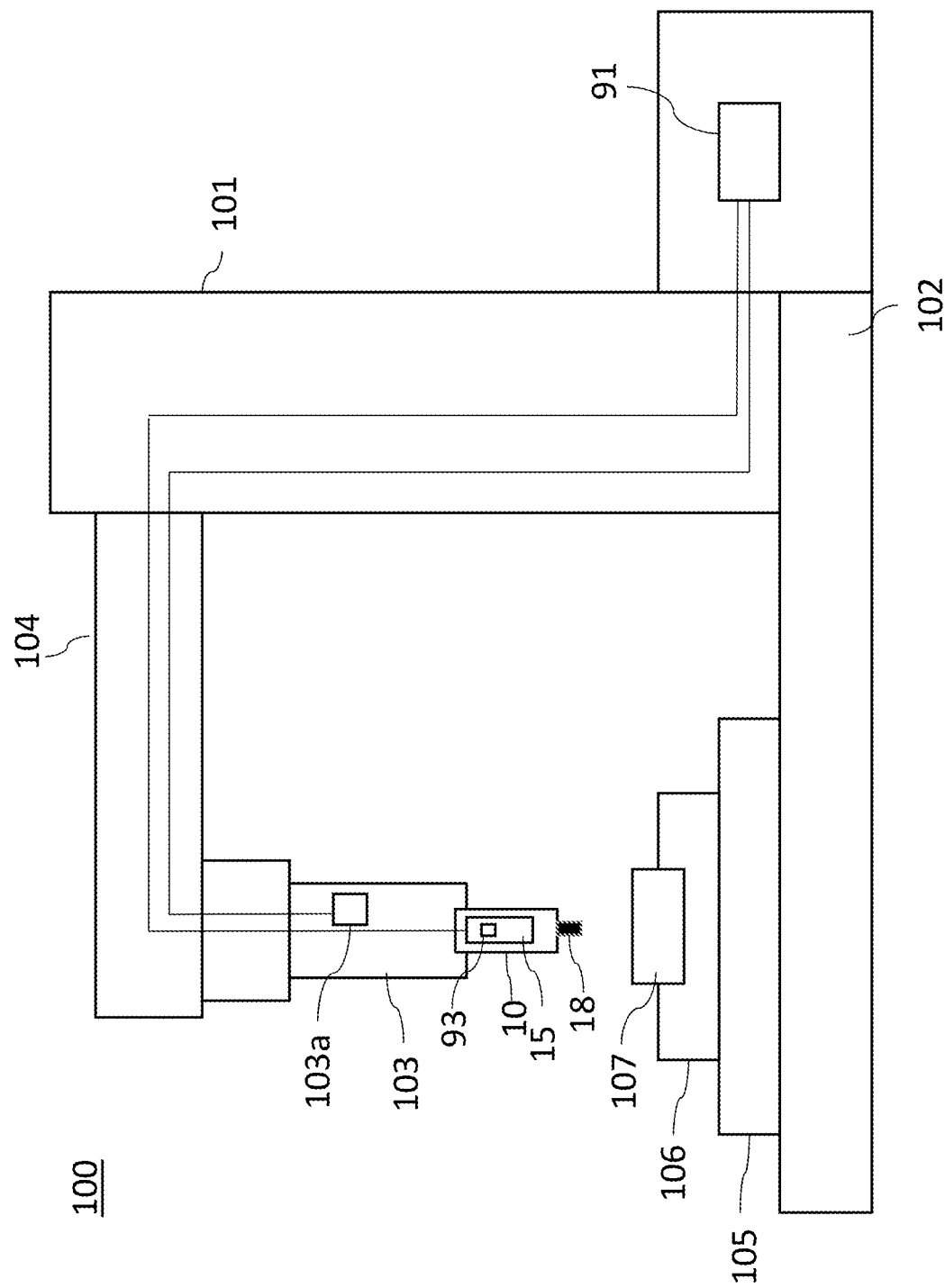

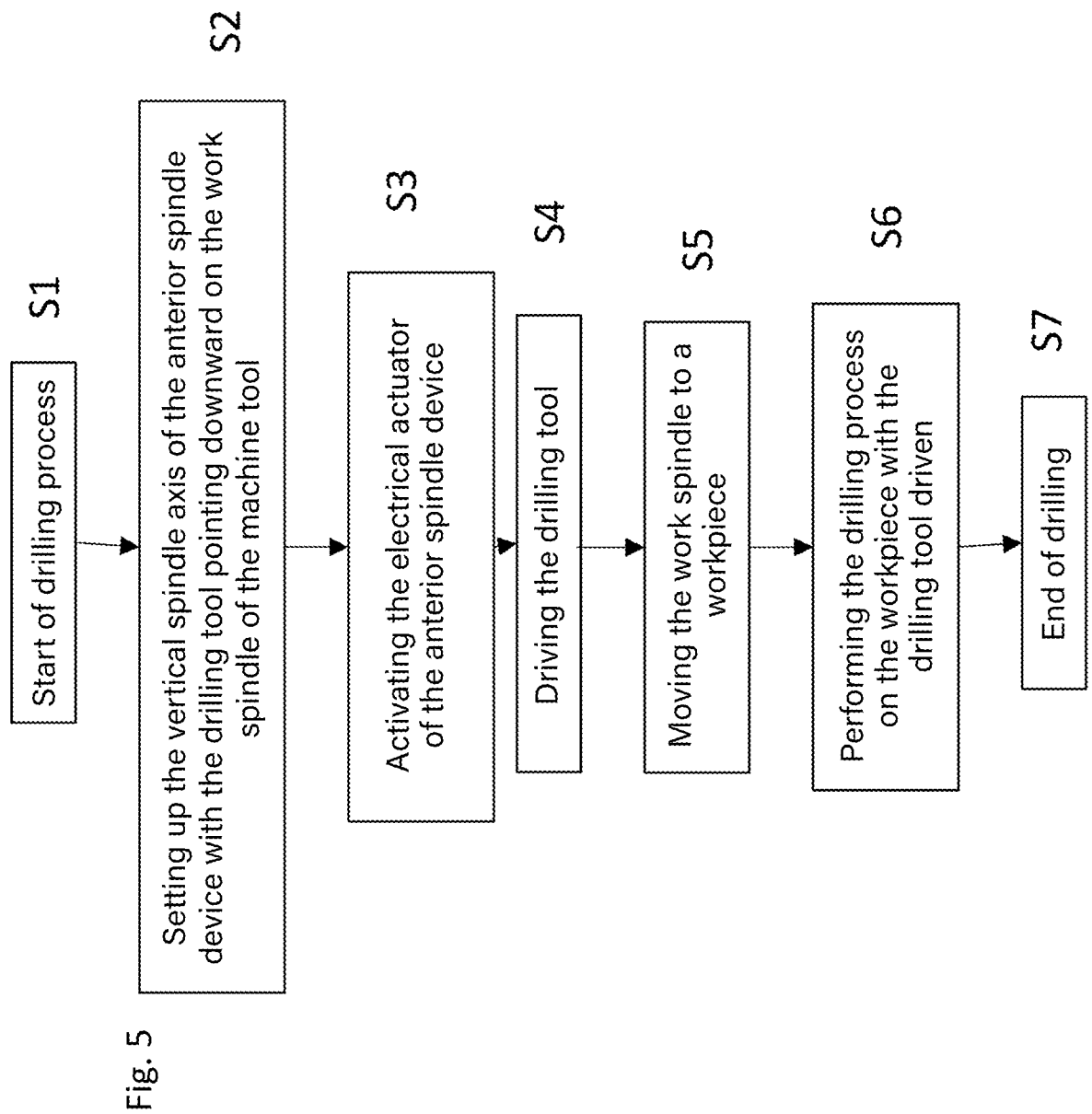

ANTERIOR SPINDLE DEVICE FOR USE ON A MACHINE TOOL

The present invention relates to an anterior spindle device for use on a machine tool, a system comprising the anterior spindle device, a method for controlling the anterior spindle device, and a computer program product for executing the method for controlling the anterior spindle device.

BACKGROUND

In the prior art, anterior spindle devices for use on machine tools are known, in particular in drilling processes in which a spindle of the anterior spindle device on the machine tool is suspended by a mechanical unit. The mechanical unit comprises a mechanical spring exerting a spring force on the spindle when weight plates are placed on it, the spindle being brought into a state of suspension by adjusting the spring force by means of an adjusting screw. On an adjusting screw of a dial gauge, an indicator is turned until the dial gauge reaches zero so that the dial gauge defines a maximum path that corresponds to a defined force. When this value is reached, a main spindle of the machine tool moves free, so that the drilling process of the machine tool can be carried out.

In the case of an anterior spindle device as described above, it has proven to be impractical that weights have to be applied manually to the anterior spindle device, since the drilling process is repeatedly disrupted by the application of the weights. Furthermore, the design of the anterior spindle device is unnecessarily enlarged by the mechanical unit, thereby limiting the machining space of the work spindle of the machine tool. By manually applying the weights, a control of the anterior spindle device cannot be implemented on the anterior spindle device.

Starting from the anterior spindle device in the prior art, it is an object of the invention to optimize the design of an anterior spindle device for use on a machine tool.

SUMMARY OF THE INVENTION

In order to solve the above-mentioned problems, anterior spindle devices, systems and methods according to the independent claims are proposed. Dependent claims relate to preferred and exemplary embodiments.

According to the present invention, an anterior spindle device for use on a machine tool is proposed, comprising a clamping interface for clamping the anterior spindle device on a work spindle of the machine tool, an anterior spindle unit with a spindle for driving a drilling tool clamped on the spindle, a drive for exerting a force on the anterior spindle unit, and an electromagnetic actuator for exerting a counterbalancing force against the force of the drive on the anterior spindle unit.

This has the advantage that the structure of the anterior spindle device is kept compact due to the electromagnetic actuator, while the functionality of a counteracting force against a force of the drive is still maintained. This results in a drilling process with a configuration ensuring that the drilling process can be carried out with a constant force and that small holes can be produced particularly well by means of the anterior spindle device.

In advantageous exemplary embodiments, the electromagnetic actuator is configured to exert a counterbalancing force corresponding to the weight of the anterior spindle unit when the anterior spindle device is clamped on the work spindle of the machine tool with the spindle axis being vertical and the drilling tool pointing downward.

In advantageous exemplary embodiments, the electromagnetic actuator is configured to exert a counterbalancing force corresponding to the weight of the anterior spindle unit in such a way that the anterior spindle unit is brought into a suspended position when the anterior spindle device is clamped on the work spindle of the machine tool with the spindle axis being vertical and the drilling tool pointing downward.

This has the advantage that the drilling process can be carried out particularly consistently and the anterior spindle unit can drill precisely, so that small holes can be drilled particularly precisely.

In advantageous exemplary embodiments, the anterior spindle device comprises a housing in which the anterior spindle unit is mounted to be movable in parallel to the spindle axis of the spindle.

The structure of the anterior spindle device is maintained particularly stable by the housing, so that the drilling process can be carried out precisely by means of the anterior spindle device.

In advantageous exemplary embodiments, the anterior spindle unit is mounted movably on guides extending in parallel to the spindle axis of the spindle.

In advantageous exemplary embodiments, the spindle includes a tool receptacle which is openly accessible on one side of the housing for receiving the drilling tool.

In advantageous exemplary embodiments, the clamping interface is arranged on the side of the housing opposite the tool receptacle of the spindle.

In advantageous exemplary embodiments, the drive serves to exert the force on the anterior spindle unit in a direction parallel to the spindle axis of the spindle, in particular away from the clamping interface and/or towards the tool receptacle of the spindle.

In advantageous exemplary embodiments, the electromagnetic actuator serves to exert the counterbalancing force on the anterior spindle unit in a direction parallel to the spindle axis of the spindle, in particular towards the clamping interface and/or away from the tool receptacle of the spindle.

In advantageous exemplary embodiments, the clamping interface is arranged in such a way that the spindle axis of the spindle is oriented in parallel, in particular coaxially, with the spindle axis of the work spindle of the machine tool when the clamping interface is clamped on the work spindle of the machine tool.

In advantageous exemplary embodiments, the drive comprises a linear motor.

In advantageous exemplary embodiments, the linear motor is configured to move the anterior spindle unit to exert the force.

In advantageous exemplary embodiments, the drive includes a position measuring means configured to determine a position of the drive and/or a distance change of the drive.

In advantageous exemplary embodiments, the anterior spindle device comprises a transmission unit for transmitting signals to a controller of the machine tool, said transmission unit being configured to control a feed movement of the work spindle of the machine tool in the direction of the spindle axis of the work spindle.

This has the advantage that the drilling process is controllable and the drilling process can be carried out automatically with the anterior spindle device. Thereby, the drilling process is optimized so that the machining of a large number of holes can be carried out in a shorter time, with the holes being processed precisely.

In advantageous exemplary embodiments, the transmission unit is configured to transmit a control signal to the controller of the machine tool, said control signal indicating a total force acting on the anterior spindle unit and/or a position or distance change of the anterior spindle unit and/or the drive.

In advantageous exemplary embodiments, the transmission unit is configured to receive a setting signal, in particular a setting signal indicating a target value, from the controller of the machine tool, the drive being configured to exert the force set on the basis of the setting signal on the anterior spindle unit.

This has the advantage that an amount of force can be defined in the drilling program and the amount of force can also be adjusted during machining. This allows for a control for exact drilling processes in which a large number of drills can be carried out in an optimized manner.

In advantageous exemplary embodiments, the spindle includes an ultrasound generator configured to generate an ultrasound vibration of the spindle, in particular in parallel to the spindle axis of the spindle.

In advantageous exemplary embodiments, the spindle comprises an inner coolant supply line, in particular in the form of a bore, for guiding coolant.

This has the advantage that the anterior spindle device can be cooled during machining and the drilling process can be carried out smoothly. Malfunctions due to heating are thus reduced or even completely avoided.

In advantageous exemplary embodiments, the clamping interface includes a hollow shank taper tool interface.

In advantageous exemplary embodiments, the anterior spindle device comprises a housing having a first half of the housing and a second half of the housing, the anterior spindle unit and the electromagnetic actuator being arranged in the first half of the housing.

In advantageous exemplary embodiments, the anterior spindle device comprises a first end portion and a second end portion, an intermediate plate being arranged between the first half of the housing and the second half of the housing, and guide rods being arranged in the first half of the housing from the intermediate plate to the second end portion for guiding the anterior spindle unit in the first half of the housing.

In advantageous embodiments, the anterior spindle unit includes a first plate and a second plate, and the anterior spindle unit further includes at least one hollow cylinder arranged between the first plate and the second plate for connecting the two plates, the spindle being fastened to the first plate and the at least one hollow cylinder being arranged radially symmetrically around the spindle.

In advantageous exemplary embodiments, the drive is arranged in the second half of the housing and comprises a rotor for moving the spindle in parallel to the spindle axis of the spindle, the rotor of the drive being fastened to the second plate of the anterior spindle unit.

In advantageous exemplary embodiments, the electromagnetic actuator comprises a stator and a rotor, the stator of the electromagnetic actuator being arranged on the anterior spindle unit and the rotor of the electromagnetic actuator being arranged on the housing and the intermediate plate.

This has the advantage that the structure of the anterior spindle device is kept particularly compact, the drilling process processing consistently and bores being drilled with high precision.

According to the present invention, a system is proposed, comprising a numerically controlled machine tool with a work spindle, and an anterior spindle device according to one of the above advantageous exemplary embodiments received on the work spindle.

In advantageous exemplary embodiments, the machine tool comprises a controller configured to control a feed movement of the work spindle of the machine tool in the direction of the spindle axis of the work spindle, and the anterior spindle device includes a transmission unit for transmitting signals to the controller of the machine tool.

In advantageous exemplary embodiments, the transmission unit is configured to transmit a control signal to the controller of the machine tool, the control signal indicating an overall force acting on the anterior spindle unit and/or a position or distance change of the anterior spindle unit and/or the drive.

In advantageous exemplary embodiments, the controller of the machine tool is configured to control or regulate a feed speed of the work spindle on the basis of the control signal received from the transmission unit of the anterior spindle device.

In advantageous exemplary embodiments, the controller of the machine tool is configured to transmit a setting signal indicating a desired force, in particular a setting signal indicating a target value, to the transmission unit of the anterior spindle device, the transmission unit being configured to receive the setting signal from the controller of the machine tool, wherein the drive is configured to exert the force set on the basis of the setting signal on the anterior spindle unit.

According to the present invention, a method for controlling a drilling process carried out using an anterior spindle device according to one of the preceding exemplary embodiments on a machine tool with a work spindle is proposed, comprising activating the electromagnetic actuator of the anterior spindle device to exert the counterbalancing force on the anterior spindle unit of the anterior spindle device when the anterior spindle device is clamped on the work spindle of the machine tool with the spindle axis being vertical and the drilling tool pointing downward, driving the drilling tool clamped on the spindle of the anterior spindle device, moving the work spindle to a workpiece, and performing the drilling process on the workpiece with the drilling tool driven by the spindle of the anterior spindle device, comprising controlling a feed movement of the work spindle in the drilling direction when the electromagnetic actuator of the anterior spindle device is activated and when the force opposite to the counterbalancing force of the electromagnetic actuator is exerted by the drive of the anterior spindle device.

According to the present invention, a computer program product is proposed, comprising instructions causing, when the program is executed by a computer connected to a numerically controlled machine tool or a controller of a numerically controlled machine tool, cause the computer or controller to carry out the method for controlling a drilling process performed using an anterior spindle device according to one of the above exemplary embodiments on a machine tool with a work spindle.

BRIEF DESCRIPTION OF THE DRAWINGS

FIG. 3 shows a further exemplary perspective illustration of an anterior spindle device for showing the forces exerted by the anterior spindle device according to the invention.

FIG. 4 shows an exemplary perspective illustration of a system comprising a machine tool and the anterior spindle device according to FIGS. 1a and 1b or 2a to 2c;

FIG. 5 shows a flowchart for illustrating a method of controlling a drilling process carried out with an anterior spindle device on a machine tool with a work spindle.

DETAILED DESCRIPTION OF THE FIGURES AND PREFERRED EMBODIMENTS

In the following, examples or exemplary embodiments of the present invention are described in detail with reference to the appended figures. The same or similar elements in the figures can be designated with the same reference symbols, but sometimes with different reference symbols.

It should be emphasized that the present invention is in no way limited or restricted by the exemplary embodiments described below and their design features, but also includes modifications of the exemplary embodiments, in particular those that are included within the scope of the independent claims by modifications of the features of the described examples or by combining one or more of the features of the described examples.

Figure 1A:
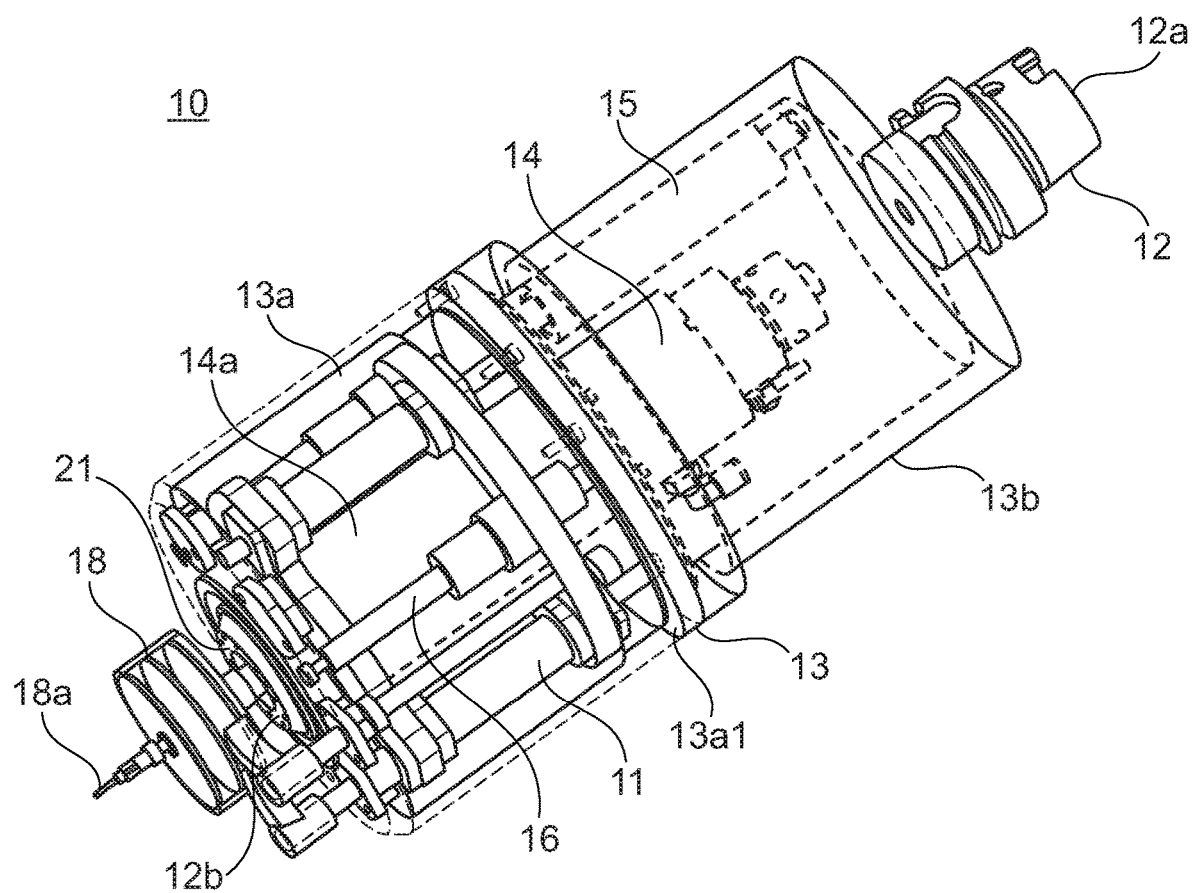
FIG. 1a shows an exemplary perspective illustration of a first exemplary embodiment of an anterior spindle device for use on a machine tool according to the invention.

FIG. 1a shows a perspective illustration of an exemplary structure of an anterior spindle device 10 comprising a clamping interface 12 for clamping on a work spindle of a machine tool on a first end side 12a and a tool receptacle 21 for clamping tools on a second end side 12b arranged opposite the first end side 12a. The clamping interface 12 for clamping on the work spindle of the machine tool is configured, for example, as a hollow shank taper tool interface.

The anterior spindle device 10 comprises a housing 13 divided into a first half of the housing 13a and a second half of the housing 13b, wherein an intermediate plate 13a1 is arranged between the first half of the housing 13a and the second half of the housing 13b, the second end portion 12b with the tool receptacle is arranged on the first half of the housing 13a and the first end portion 12a, on which the clamping interface 12 is arranged, is arranged on the second half of the housing.

An anterior spindle unit 14 of the anterior spindle device 10 is arranged in the housing 13 and is configured to be movable. The anterior spindle unit 14 comprises a spindle 14a, which includes, for example, an ultrasound generator for generating ultrasound vibration generated in parallel to a spindle axis of the spindle 14a. The spindle 14a is therefore configured as an ultrasonic spindle.

The anterior spindle device 10 further comprises a drive 15 arranged, for example, in the second half of the housing 13b. The drive 15 can be configured, for example, as a linear motor, but can also be configured as any other conceivable type of drive. The drive 15 is configured to exert a predefined force on the anterior spindle unit 14.

The anterior spindle device 10 further comprises an electromagnetic actuator 16 arranged, for example, in the first half of the housing 13a. The electromagnetic actuator 16 is configured to exert a counterbalancing force to the force exerted by the drive on the anterior spindle unit 14. The electromagnetic actuator 16 is configured, for example, as a magnetic spring, which brings the anterior spindle unit 14 into suspension by means of the counterbalancing force exerted. While the drive 15 exerts the force on the anterior spindle unit 14, the electromagnetic actuator 16 brings the anterior spindle unit 14 into a state of suspension by means of a counterbalancing force exerted. The electromagnetic actuator 16 may be configured, for example, as a permanent magnet with a steel core. The electromagnetic actuator 16 may be configured, for example, as a coil exerting a magnetic force on the anterior spindle unit 14 due to an induced current. The electromagnetic actuator is not restricted by the embodiments described here and may be configured in any form so that a magnetic or electromagnetic force is exerted on the anterior spindle unit 14.

The tool receptacle 21 configured to clamp tools is arranged on the second end side 12b of the anterior spindle device 10. In order to carry out a drilling process, for example, a hollow drill 18a with an ejector unit 18 may be clamped on the tool receptacle 21. The ejector unit 18 is configured such that the drill cores formed in the drilling process, which are collected in the hollow drill 18a during the drilling process, are ejected by an ejection force exerted by the ejector unit 18 and the hollow drill 18a is thus freed from the resulting drill cores. The ejection force exerted by the ejector unit 18 is applied, for example, by an electromagnetic force.

Figure 1B:
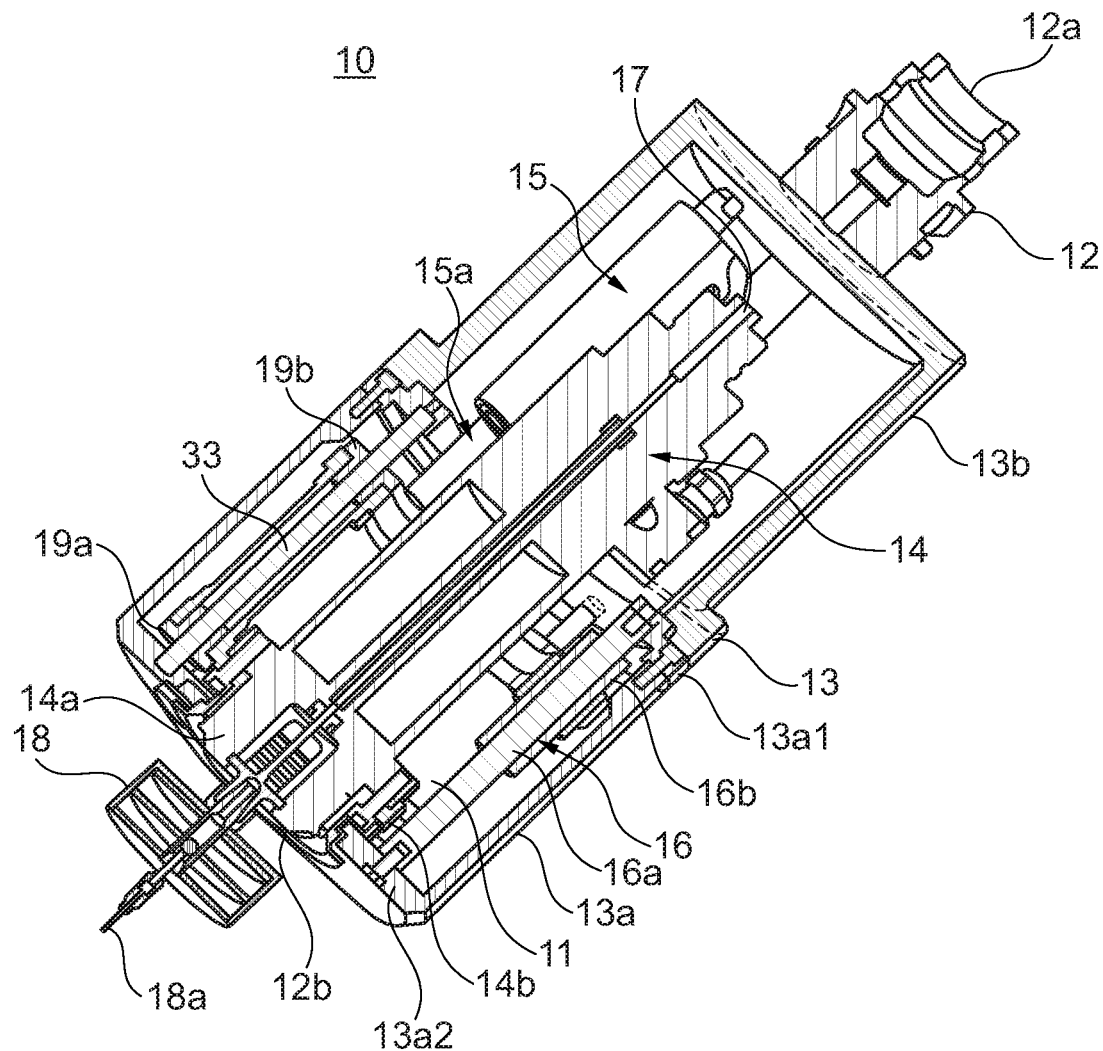
FIG. 1b shows a further exemplary perspective illustration of the first exemplary embodiment of an anterior spindle device for use on a machine tool according to the invention.

FIG. 1b shows the anterior spindle device 10 shown in FIG. 1a in a cross section, the cross section being shown in such a way that the anterior spindle device 10 is sectioned in a central axis. The components of the anterior spindle device 10 already described in FIG. 1 are arranged equally in FIG. 1b.

The anterior spindle unit 14 comprises a first annular plate 19a, a second annular plate 19b, and at least one hollow cylinder 11 arranged in the first half of the housing 13a. The anterior spindle unit 14 shown in FIG. 1b comprises, for example, three hollow cylinders 11. The first annular plate 19a is arranged in parallel to the second annular plate 19a in the first half of the housing 13a, the first annular plate 19a being connected by means of the hollow cylinders 19c arranged perpendicular to the two annular plates 19a, 19b. Guide rods 22 are arranged through the hollow cylinders 11 and extend from the intermediate plate 13a1 to the second end side 12b of the anterior spindle device 10. Ball guides are arranged in the hollow cylinders 11 such that the anterior spindle unit 14 can be guided on the guide rods 33. The guiding of the anterior spindle unit 14 within the first half of the housing 13a runs axially with respect to a spindle axis of the spindle 14a. The anterior spindle unit 14 is therefore arranged to move freely in the axial spindle direction of the spindle 14a in the first half of the housing 13a. The guide rods 33 extend inside the hollow cylinders 11 and are arranged in parallel to the hollow cylinders 11.

The spindle 14a is arranged on the first annular plate 19a of the anterior spindle unit 14. The spindle 14a is configured such that it is oriented in parallel to the hollow cylinders 11 and is arranged within the two annular plates 19a, 19b, the two annular plates 19a, 19b being arranged perpendicularly to the spindle 14a. The hollow cylinders 11 and the guide rods 33 extending through the hollow cylinders 11 are arranged radially symmetrically around the spindle 14a.

The electromagnetic actuator 16 comprises a rotor 16a and a stator 16b. The stator 16b of the electromagnetic actuator 16 is arranged on the second annular plate 19b of the anterior spindle unit 14. The rotor 16a is fastened to the intermediate plate 13a1 and to the second end side 12b of the anterior spindle device 10, the rotor 16a of the electromagnetic actuator 16 extending inside the stator 16b of the electromagnetic actuator 16. While the rotor 16a of the electromagnetic actuator 16 is fixedly arranged on the intermediate plate 13a1 and on the second end side 12b of the anterior spindle device 10, the stator 16b of the electromagnetic actuator 16 is arranged on the anterior spindle unit 14, which is freely movable in the axial spindle axis of the spindle 14a.

The drive 15 comprises a rotor 15a, the rotor 15a being movable in one direction. The drive 15 may be configured, for example, as a linear motor, but may also be configured as any other conceivable type of drive. The drive 15 is arranged in the second half of the housing 13b and the rotor 15a of the drive 15 is fastened to the second annular plate 19b of the anterior spindle unit 14. In a drilling process, the predefined force is exerted on the anterior spindle unit 14 in that the rotor 15a of the drive 15, which is fastened to the second annular plate 19b, exerts the force predefined in the drive 15 on the anterior spindle unit 14. While the drive 15 exerts the predefined force on the anterior spindle unit 14, the electromagnetic actuator 16 exerts a counterbalancing force on the anterior spindle unit 14, so that the anterior spindle unit 14 is brought into a state of suspension.

The hollow drill 18a clamped on the tool receptacle 21 comprises the ejector unit 18 configured to eject drill cores. The ejector unit 18 comprises, for example, a first coil and a second coil, a circuit board, an electromagnetic switching device, a voltage source, a magnet and an ejector. The ejector is arranged on the magnet, which is a neodymium rod or ball magnet, for example.

By applying a current to the first coil, the first coil is energized and the ejector attached to the magnet is brought into a first position. The second coil is driven by applying a current to the second coil. The ejector is brought into a second position by deenergizing the first coil and by driving the second coil. If the first position is defined as a starting position, this position defines the state in which a drilling process of a bore is performed. After the drilling process has been completed, the first coil is deenergized and the second coil is driven, so that the ejector is moved from the first position to the second position. The drill core created in the drilling process is ejected from the first position to the second position by moving the ejector. After the drill core has been ejected, the ejector is brought into the first position by deenergizing the second coil and by driving the first coil.

The ejector unit 18 can be controlled by a control unit. When the ejector unit 18 is driven, the duration and frequency of the ejector can be controlled and/or regulated. In drilling processes with hollow drills, the drill cores created in drilling processes cause disruptions in the machining process since hollow drills may become blocked or end up in the machining area of the machine tool. The ejector unit 18 described above has the advantage that drilling cores are ejected in a controlled manner. Blockage of hollow drills is reduced or avoided by the ejector unit 18. The ejector unit 18 allows the drilling cores to be ejected sufficiently far and in a controlled manner, so that the drilling cores are not ejected into the machining area of the machine tool. By controlling the drilling core ejection, the drilling processes are optimized since disruptions are avoided. By means of the control, the drilling processes can be automated further and drilling processes can be carried out consistently. When manufacturing many small bores, the production is further optimized and the susceptibility to malfunctions of the machine tool is reduced.

The spindle 14a of the anterior spindle unit 14 comprises an inner coolant supply line 17 configured to conduct coolant. The inner coolant line is configured, for example, as a bore. The coolant is supplied, for example, from the outside to the anterior spindle device 10 and passed on through a connection to the inner coolant supply line. The coolant supply can be controlled from the outside, for example.

Figure 2A:
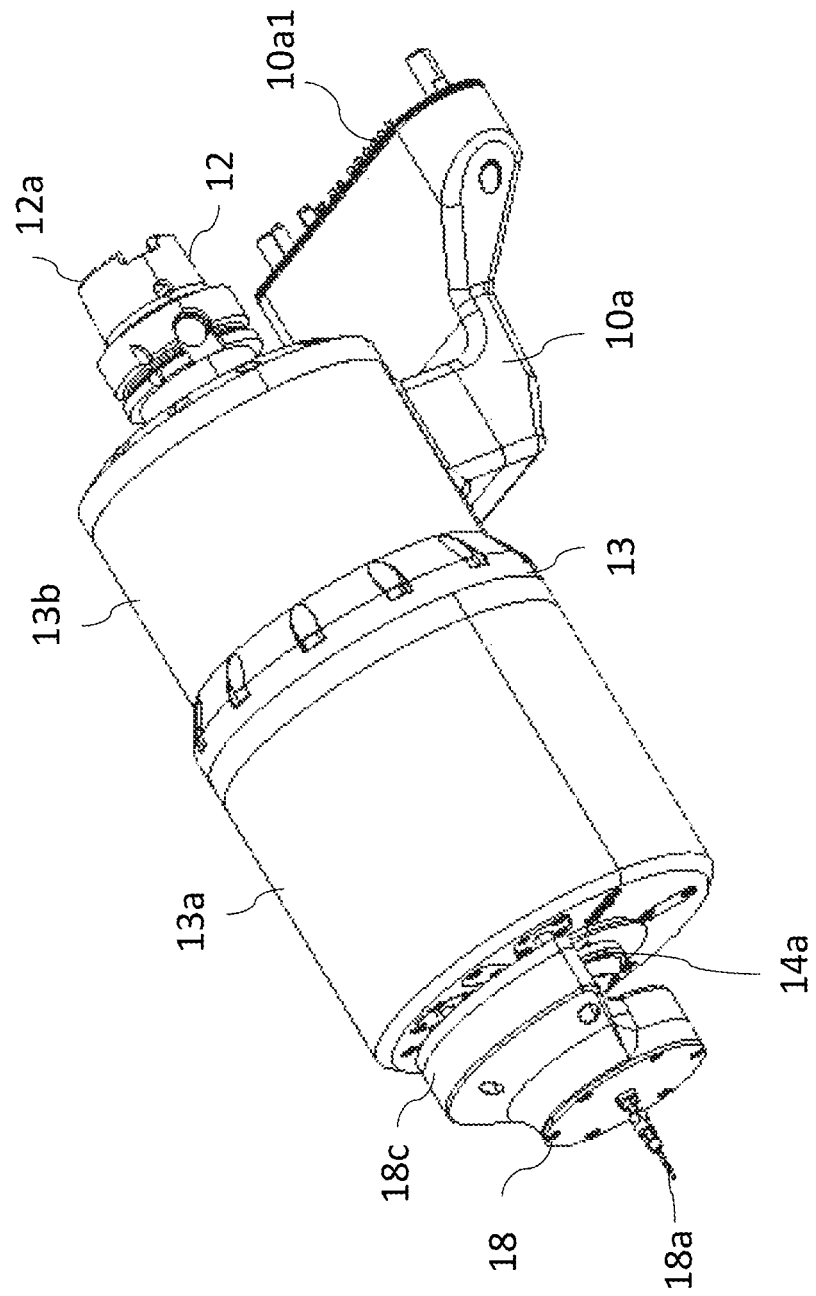
FIG. 2a shows an exemplary perspective illustration of a second exemplary embodiment of an anterior spindle device for use on a machine tool according to the invention.

FIG. 2a shows a second exemplary embodiment of an anterior spindle device 10. The same or corresponding features or assemblies of the anterior spindle device 10 are given the same reference symbols as those from FIGS. 1a and 1 b. The following description deals in particular with further features and the same or similar features are not described again.

The anterior spindle device 10 comprises, for example, a docking portion 10a configured to dock the anterior spindle device 10 to a machine tool. The docking portion 10a comprises, for example, a plurality of connection elements 10a1 interacting with corresponding contacts or connections of the machine tool when the anterior spindle device 10 is connected to the machine tool.

The anterior spindle device 10 may be docked to the machine tool or the work spindle of the machine tool by means of the docking portion 10a, e.g., such that the anterior spindle device 10 can be controlled via the machine tool or the machine control thereof.

For this purpose, the connection elements 10a1 include, for example, electrical contacts for power supply and for signal transmission of control signals (e.g., for drives, motors and/or other electrical or electromagnetic or piezoelectric actuators) or, if appropriate, also for the backtransmission of any sensor signals to the machine control.

The connection elements 10a1 further comprise, for example, electrical, pneumatic and/or hydraulic connections for the anterior spindle device 10.

The anterior spindle device 10, the anterior spindle unit 14, the spindle 14a and the ejector unit 18 may be supplied by the docking portion 10a. For example, the docking portion 10a may also be configured such that the anterior spindle device is supplied with coolant via the docking portion 10a.

The ejector unit 18 is connected, for example, via a holder unit 18c to the first half of the housing 13a of the anterior spindle device 10. The ejector unit 18 may be held via the holder unit 18c and, if necessary, may also be supplied or controlled, for example with current and control signals.

Figure 2B:
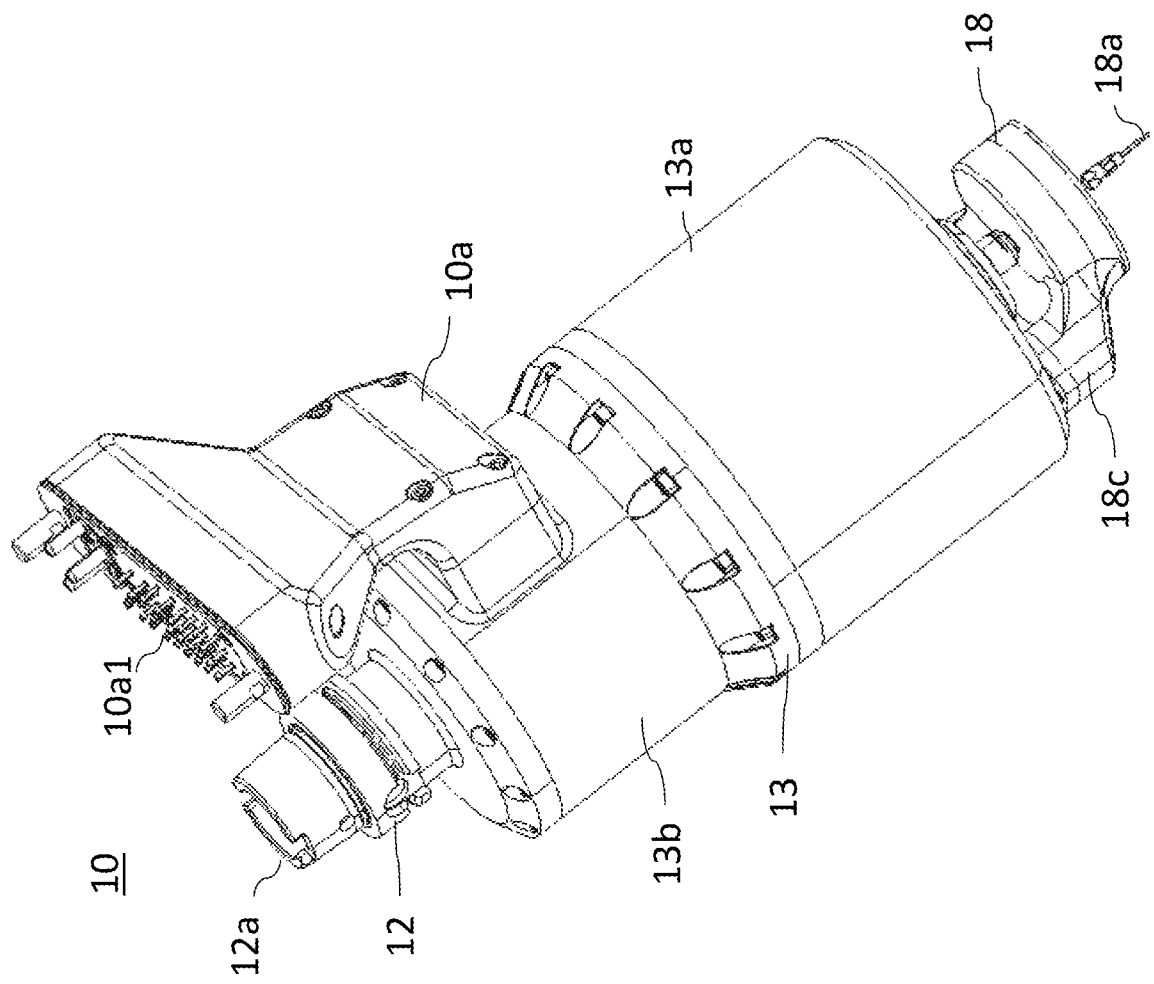
FIG. 2b shows a further exemplary perspective illustration of the second exemplary embodiment of an anterior spindle device for use on a machine tool according to the invention.

FIG. 2b shows the anterior spindle device 10 of the second exemplary embodiment from a different perspective than in FIG. 2a. The anterior spindle device 10 comprises the docking portion 10a with the connection elements 10a1, as already described in FIG. 2a.

The docking portion 10a is arranged, for example, laterally on the second half of the housing 13b of the anterior spindle device 10. The docking portion 10a is connected, for example, at right angles to the second housing half, the docking portion 10a being L-shaped, for example, such that the connection elements 10a1 are oriented, for example, in parallel to the spindle 14a.

Figure 2C:
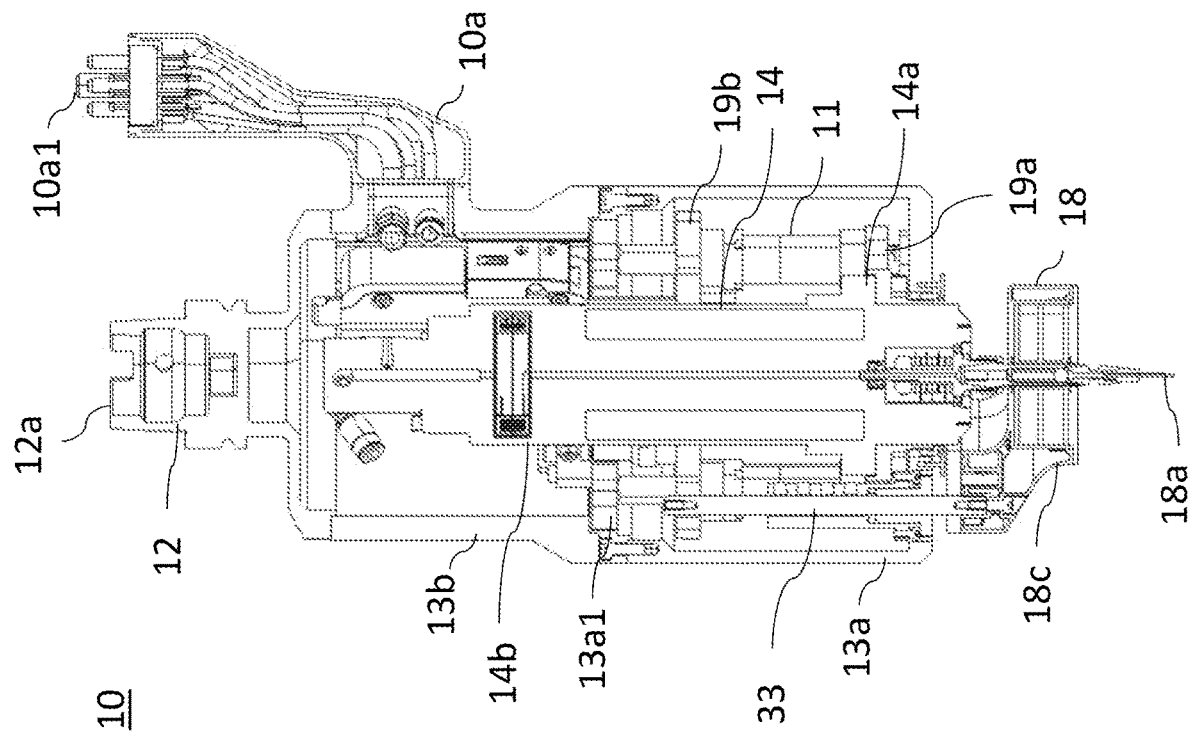
FIG. 2c shows a further exemplary perspective illustration of the second exemplary embodiment of an anterior spindle device for use on a machine tool according to the invention.

FIG. 2c shows the anterior spindle device 10 from FIGS. 2a and 2b in a cross section. The anterior spindle device comprises the anterior spindle unit 14 with the spindle 14. The spindle 14 includes, for example, an actuator 14b configured, for example, to generate an ultrasonic movement or ultrasonic vibration of the spindle 14. The actuator 14b is configured, for example, such that the spindle 14a is configured as an ultrasonic spindle. The actuator 14b may comprise, for example, piezo actuators.

For example, the anterior spindle device is configured such that the guide rod 33 is arranged such that it is fastened to the intermediate plate 13a1 and to the holder unit 18c. The ejector unit 18 is advantageously stabilized by the connection of the holder unit 18c to the guide rod 33.

FIG. 3 shows the anterior spindle device 10 according to one of the exemplary embodiments from FIGS. 1a, 1b and 2a, 2b and 2c clamped, by way of example, on a work spindle 103 of a machine tool. The work spindle 103 with the clamped anterior spindle device 10 is arranged vertically, for example, in a drilling process. The anterior spindle unit 14 is freely movable in the anterior spindle device 10, so that a weight force F_GK acts on the anterior spindle unit 14. The electromagnetic actuator 16 of the anterior spindle device 10 exerts a counterbalancing force F_EMA on the anterior spindle unit 14 in order to counteract the weight force F_GK. The magnitude of the counterbalancing force F_EMA of the electromagnetic actuator 16 is a value which counteracts the weight force F_GK to such an extent that the anterior spindle unit 14 is put into a state of suspension.

In a drilling process (see, for example, FIG. 5, in particular step S6), the work spindle 103 with the anterior spindle devices 10, in which a tool, for example a hollow drill 18a, is clamped, is moved by the work spindle 103 in the direction of a workpiece 107 clamped on a workpiece table 105.

When the machine tool moves up to the workpiece and touches it for drilling, a drilling force F_BK acts on the anterior spindle device 10. The drive 15 of the anterior spindle device 10 exerts a force F_A on the anterior spindle unit 14 in order to counteract the drilling force F_BK. The force exerted by the drive 15 is predefinable and is such that the drive 15 counteracts the drilling force F_BK and bores can be drilled by means of the force F_A of the drive 15. The force F_A is adjustable and can therefore be adapted to a wide variety of workpieces.

FIG. 4 shows a numerically controlled machine tool 100 with a work spindle 103, an anterior spindle device 10 being received on the work spindle 103. The anterior spindle device 10 is, for example, one of the anterior spindle devices 10 shown in FIGS. 1a, 1b or 2a, 2b, 2c and 3. Components of the anterior spindle device 10 identical to the components of the anterior spindle device 10 from FIGS. 1a, 1b or 2a, 2b, 2c and 3, have the same reference symbols.

The machine tool 100 comprises a machine bed 102 and a machine stand 101 arranged on the machine bed 102. The machine stand 101 may, for example, be arranged movably in one or more directions on the machine bed 102. A work spindle carrier 104 carrying the work spindle 103 is arranged on the machine stand 101. The work spindle carrier 104 may be movable in one or more directions, for example. The work spindle 103 is driven by a drive 103a. The machine tool 100 further comprises a workpiece table 105 arranged on the machine bed 102 with a workpiece clamping means 106 in which a workpiece 107 is clamped. The workpiece table 105 may be configured, for example, as a rotary table or as a swivel rotary table. The workpiece table 105 may be arranged on the machine bed 102 so as to be movable in one or more directions.

The machine tool 100 comprises a controller 91 configured such that the work spindle 103 executes a feed movement in the axial direction. The controller 91 controls the drive 103a of the work spindle 103. The work spindle 103 is, for example, set up vertically, so that the anterior spindle device 10 clamped on the work spindle 103 is arranged vertically. The work spindle 103 and the anterior spindle device 10 are oriented in parallel to one another. The controller 91 controls that the work spindle 103 is movable in the direction of the spindle axis of the work spindle 103.

The anterior spindle device 10 comprises a transmission unit 93 transmitting signals to the controller 91 of the machine tool 100. When a force is exerted on the anterior spindle unit 14 of the anterior spindle device 10 by means of the drive 15, said force being detected, for example, by a displacement and/or a distance change of the anterior spindle unit 14, the transmission unit 93 transmits a control signal to the controller 91 of the machine tool 100. The controller 91 receives this control signal of the transmission unit 93 of the anterior spindle device 10 and controls the work spindle 103 of the machine tool 100 to react to the displacement and/or the distance change such that the displacement and or distance change is compensated for.

In a drilling process, for example, the anterior spindle unit 14 of the anterior spindle device 10 is held in suspension by the electromagnetic actuator 16. In the next step, the work spindle 103 of the machine tool 100 moves to the workpiece 107 arranged on the workpiece table 105 and begins the drilling process. When the hollow drill 18a is placed on the workpiece, the force predefined at the drive 15 of the anterior spindle device 10 acts on the workpiece 107 for drilling bores. The predefined force is transmitted from the controller 91 of the machine tool 100 to the transmission unit 93 of the anterior spindle device 10 by means of a setting signal, in particular a setting value indicating a target value, the drive 15 being configured to exert the force predefined on the basis of the setting signal. If, during the drilling process of the hollow drill 18a, a counterforce, that is exerted, for example, by the workpiece 107 itself, exceeds the predefined force on the drive 15 of the anterior spindle device 10, the transmission unit 93 transmits the control signal to the controller 91 of the machine tool 100 and the controller 91 controls the drive 103a of the work spindle 103 to reduce the feed movement.

After the anterior spindle unit 14 has been brought into the state of suspension by the electromagnetic actuator 16 and the controller 91 has transmitted the predefined force to the transmission unit 93 of the anterior spindle device 10, the force being exerted by the drive 15 of the anterior spindle device 10, the drilling process is carried out. With the control by means of the controller 91 of the machine tool 100 and the transmission unit 93 of the anterior spindle device 10, the drilling process by means of the anterior spindle device 10 can be controlled and faults in the drilling process can be avoided. For example, a distance change at the drive 15 of the anterior spindle device 10 is used to measure an amount of force, which is transmitted to the controller 91 of the machine tool 100 by the transmission unit 93 of the anterior spindle device 10, whereupon the drive 103a of the work spindle 103 of the machine tool 100 can be controlled to react to this distance change.

FIG. 5 shows an exemplary flow diagram for illustrating a method of controlling a drilling process carried out with an anterior spindle device 10 on a machine tool 100 with a work spindle 103. The machine tool may be, for example, the machine tool 100 from FIG. 4, but may also be any controllable machine tool having an anterior spindle device 10 clamped on a work spindle.

As an example, the drilling process is started in step S1. The drilling process comprises a step S2 of setting up the spindle axis of the anterior spindle device, which is for example oriented vertically, on the work spindle of the machine tool with the drilling tool pointing downward. Here, the anterior spindle device 10 is brought into a vertical position, for example. The spindle axis of the anterior spindle device 10 is oriented vertically, so that, for example, the hollow drill 18a clamped on the anterior spindle device 10 on the work spindle 103 of the machine tool 100 is pointed downward.

In a further step S3, the electromagnetic actuator 16 of the anterior spindle device 10 is activated. Thereby a magnetic field, which is induced, for example, by applying a voltage, is established, for example, in such a way that the anterior spindle unit 14 of the anterior spindle device 10 is brought into a state of suspension. Since the anterior spindle device 10 has been oriented vertically, the anterior spindle unit 14 is pulled down by gravity. The magnetic field created by the electromagnetic actuator 16 exerts the upwards counterbalancing force on the anterior spindle unit 14 in order to compensate for the weight, so that the anterior spindle unit 14 is brought into the state of suspension.

In a further step S4, a drilling tool (for example the hollow drill 18a from FIG. 1b) clamped on the spindle 14a of the anterior spindle device 10 is driven.

In a further step S5, the work spindle 103 of the machine tool with the anterior spindle device 10 received thereon is moved with a drilling tool to the workpiece 107, for example vertically downward.

In a further step S6, the drilling process is performed on the workpiece with the drilling tool driven by the spindle 14a of the anterior spindle device 10.

In step S6, the feed movement of the work spindle 103 of the machine tool 100 is controlled such that the drilling tool first moves in the direction of the workpiece 107 (drilling process) and then possibly away from the workpiece 107 again.

During the feed movement, the electromagnetic actuator 16 is activated, so that the anterior spindle unit 14 is kept in the state of suspension. The electromagnetic actuator 16 exerts the counterbalancing force on the anterior spindle unit 14 in order to compensate for the force acting on the anterior spindle unit 14. During the drilling process, the force predefined by the control unit 91 is exerted by the drive 15 of the anterior spindle device 10 and is thus the drill into the workpiece 107 performed.

The steps of the method described above do not have to be carried out in the order described above, but may be carried out in many variations and may also be performed several times.

The method may also be performed by a computer program product comprising instructions which, when the program is executed by a computer connected to the numerically controlled machine tool 100 or the controller 91 of the numerically controlled machine tool 100, control a drilling process carried out with the anterior spindle device 10 on the machine tool 100 with the work spindle 103 in order to execute the method.

Above examples and exemplary embodiments of the present invention and their advantages have been described in detail with reference to the accompanying figures. It should be emphasized again that the present invention is in no way limited or restricted by the exemplary embodiments described above and their design features, but instead further includes modifications of the exemplary embodiments, in particular those that are included within the scope of the independent claims as a result of modifications to the features of the described examples or combinations of one or more of the features of the described examples.

The invention claimed is:

1. An anterior spindle device for use on a machine tool (100), comprising:
    a clamping interface (12) for clamping said anterior spindle device on a work spindle (103) of said machine tool (100);
    an anterior spindle unit (14) with a spindle (14a) for driving a drilling tool clamped on said spindle (14a); and
    a drive (15) for exerting a force on said anterior spindle unit (14),
    characterized by
    an electromagnetic actuator (16) for exerting a counterbalancing force opposite to the force of said drive (15) on said anterior spindle unit (14).

2. The anterior spindle device according to claim 1, characterized in that
    said electromagnetic actuator (16) is configured to exert a counterbalancing force corresponding to the weight of said anterior spindle unit (14) when said anterior spindle device is clamped on said work spindle (103) of said machine tool (100) with the spindle axis being vertical and the drilling tool pointing downward.

3. The anterior spindle device according to claim 1, characterized in that
    said electromagnetic actuator (16) is configured to exert a counterbalancing force corresponding to the weight of said anterior spindle unit (14) such that said anterior spindle unit (14) is brought into a suspended position when said anterior spindle device is clamped on said work spindle (103) of said machine tool (100) with the spindle axis being vertical and the drilling tool pointing downward.

4. The anterior spindle device according to claim 1, characterized by
    a housing (13) in which said anterior spindle unit (14) is mounted to be movable in parallel to said spindle axis of said spindle (14a).

5. The anterior spindle device according to claim 4, characterized in that
    said anterior spindle unit (14) is mounted to be movable on guides extending in parallel to the spindle axis of said spindle (14a).

6. The anterior spindle device according to claim 4, characterized in that
    said spindle (14a) includes a tool receptacle (21) openly accessible on one side of said housing (13) for receiving the drilling tool.

7. The anterior spindle device according to claim 6, characterized in that
    said clamping interface (12) is arranged on the side of said housing (13) opposite said tool receptacle (21) of said spindle (14a).

8. The anterior spindle device according to claim 7, characterized in that
    said drive (15) serves to exert the force on said anterior spindle unit (14) in a direction parallel to the spindle axis of said spindle (14a).

9. The anterior spindle device according to claim 7, characterized in that said electromagnetic actuator (16) serves to exert the counterbalancing force on said anterior spindle unit (14) in a direction parallel to the spindle axis of said spindle (14a).

10. The anterior spindle device according to claim 1, characterized in that
said clamping interface (12) is arranged such that the spindle axis of said spindle (14a) is oriented in parallel with the spindle axis of said working spindle (103) of said machine tool (100) when said clamping interface (12) is clamped on said working spindle (103) of said machine tool (100).

11. The anterior spindle device according to claim 1, characterized in that
said drive (15) comprises a linear motor.

12. The anterior spindle device according to claim 11, characterized in that
said linear motor is configured to move said anterior spindle unit (14) for exerting the force.

13. The anterior spindle device according to claim 1, characterized in that
said drive (15) includes a position measuring means configured to determine a position of said drive (15) and/or a distance change of said drive (15).

14. The anterior spindle device according to claim 1, characterized by
a transmission unit (93) for transmitting signals to a controller (91) of said machine tool (100), said transmission unit being configured to control a feed movement of said work spindle (103) of said machine tool (100) in the direction of the spindle axis of said work spindle (103).

15. The anterior spindle device according to claim 14, characterized in that
said transmission unit (93) is configured to transmit a control signal to said controller (91) of said machine tool (100), said control signal indicating a total force acting on said anterior spindle unit (14) and/or a position or distance change of said anterior spindle unit (14) and/or said drive (15).

16. The anterior spindle device according to claim 14, characterized in that
said transmission unit (93) is configured to receive a setting signal from said controller (91) of said machine tool (100), wherein said drive (15) is configured to exert the force set on the basis of the setting signal on said anterior spindle unit (14).

17. The anterior spindle device according to claim 1, characterized in that
said spindle (14a) includes an ultrasound generator configured to generate an ultrasound vibration of said spindle (14a).

18. The anterior spindle device according to claim 1, characterized in that
said spindle (14a) comprises an inner coolant supply line (17) for guiding coolant.

19. The anterior spindle device according to claim 1, characterized in that
said clamping interface (12) includes a hollow shank taper tool interface.

20. The anterior spindle device according to claim 1, characterized in that
said anterior spindle device has a housing (13) with a first half of the housing (13a) and a second half of the housing (13b), wherein said anterior spindle unit (14) and said electromagnetic actuator (16) are arranged in said first half of the housing (13a).

21. The anterior spindle device according to claim 20, characterized in that
said anterior spindle device comprises a first end portion (12a) and a second end portion (12b),
wherein an intermediate plate (13a1) is arranged between said first half of the housing (13a) and said second half of the housing (13b), and
wherein guide rods (33) are arranged in said first half of the housing (13a) from said intermediate plate (13a1) to said second end portion (12b) for guiding said anterior spindle unit (14) in said first half of the housing (13a).

22. The anterior spindle device according to claim 20, characterized in that
said drive (15) is arranged in said second half of the housing (13b) and comprises a rotor (15a) for moving said spindle (14a) in parallel to the spindle axis of said spindle (14a), wherein said rotor (15a) of said drive (15) is fastened to said second plate (19b) of said anterior spindle unit (14).

23. The anterior spindle device according to claim 1, characterized in that
said anterior spindle unit (14) includes a first plate (19a) and a second plate (19b), and
said anterior spindle unit (14) further includes at least one hollow cylinder (11) arranged between said first plate (19a) and said second plate (19b) for connecting the two plates (19a, 19b),
wherein said spindle (14a) is fastened to said first plate (19a) and said at least one hollow cylinder (11) is arranged radially symmetrically around said spindle (14a).

24. The anterior spindle device according to claim 1, characterized in that
said electromagnetic actuator (16) includes a stator (16b) and a rotor (16a),
wherein said stator (16b) of said electromagnetic actuator (16) is arranged on said anterior spindle unit (14) and said rotor (16a) of said electromagnetic actuator (16) is arranged on said housing (13) and said intermediate plate (13a1).

25. A system, comprising:
a numerically controlled machine tool (100) with a work spindle (103), and
an anterior spindle device according to claim 1 received on said work spindle (103).

26. The system according to claim 25, characterized in that
said machine tool (100) comprises a controller (91) configured to control a feed movement of said work spindle (103) of said machine tool (100) in the direction of the spindle axis of said work spindle (103), and
said anterior spindle device includes a transmission unit (93) for transmitting signals to said controller (91) of said machine tool (100).

27. The system according to claim 26, characterized in that
said transmission unit (93) is configured to transmit a control signal to said controller (91) of said machine tool (100), said control signal indicating a total force acting on said anterior spindle unit (14) and/or a position or distance change of said anterior spindle unit (14) and/or said drive (15).

28. The system according to claim 27, characterized in that
said controller (91) of said machine tool (100) is configured to control or regulate a feed speed of said work spindle (103) on the basis of the control signal received from said transmission unit (93) of said anterior spindle device.

29. The system according to claim 26, characterized in that said controller (91) of said machine tool (100) is configured to transmit a setting signal indicating a desired force to said transmission unit (92) of said anterior spindle device, wherein said transmission unit (93) is configured to receive said setting signal from said controller (91) of said machine tool (100), said drive (15) being configured to exert the force set on the basis of said setting signal on said anterior spindle unit (14).

30. A method for controlling a drilling process carried out with an anterior spindle device according to claim 1 on a machine tool (100) with a work spindle (103), comprising:

activating said electromagnetic actuator (16) of said anterior spindle device for exerting the counterbalancing force on said anterior spindle unit (14) of said anterior spindle device when said anterior spindle device is clamped on said work spindle (103) of said machine tool (100) with the spindle axis being vertical and the drilling tool pointing downward;

driving the drilling tool clamped on said spindle (14a) of said anterior spindle device;

moving said work spindle (103) to a workpiece (107); and performing the drilling process on said workpiece (107) with the drilling tool driven by said spindle (14a) of said anterior spindle device, comprising controlling a feed movement of said work spindle (103) in the drilling direction when said electromagnetic actuator (16) of said anterior spindle device is activated and when force opposite to the counterbalancing force of said electromagnetic actuator (16) is exerted by said drive (15) of said anterior spindle device.

31. A non-transitory computer readable medium having stored thereon a computer program product, comprising instructions that cause, when said program is executed by a computer connected to a numerically controlled machine tool (100) or a controller (91) of a numerically controlled machine tool (100), said computer or said controller to execute the method according to claim 30.

* * * * *